United States Patent
Permanyer et al.

(10) Patent No.: US 12,479,262 B2
(45) Date of Patent: Nov. 25, 2025

(54) ACTIVE ROLLER BAR DAMPER ASSEMBLY

(71) Applicant: JAGUAR LAND ROVER LIMITED, Warwickshire (GB)

(72) Inventors: Enric Permanyer, Coventry (GB); Andrei-Iulian Dumitru, Coventry (GB)

(73) Assignee: JAGUAR LAND ROVER LIMITED, Coventry (GB)

(*) Notice: Subject to any disclaimer, the term of this patent is extended or adjusted under 35 U.S.C. 154(b) by 0 days.

(21) Appl. No.: 18/700,444

(22) PCT Filed: Oct. 12, 2022

(86) PCT No.: PCT/EP2022/078415
§ 371 (c)(1),
(2) Date: Apr. 11, 2024

(87) PCT Pub. No.: WO2023/062087
PCT Pub. Date: Apr. 20, 2023

(65) Prior Publication Data
US 2024/0408932 A1 Dec. 12, 2024

(30) Foreign Application Priority Data
Oct. 14, 2021 (GB) .................... 2114663

(51) Int. Cl.
*B60G 21/10* (2006.01)
*B60G 13/16* (2006.01)
(52) U.S. Cl.
CPC ........... *B60G 21/106* (2013.01); *B60G 13/16* (2013.01); *B60G 2202/32* (2013.01)
(58) Field of Classification Search
CPC ... B60G 21/106; B60G 13/16; B60G 2202/32
See application file for complete search history.

(56) References Cited

U.S. PATENT DOCUMENTS

| 5,013,166 A | 5/1991 | Domer |
| 5,884,902 A * | 3/1999 | Hamada .................. F16F 7/108 267/141 |

(Continued)

FOREIGN PATENT DOCUMENTS

| DE | 102016203950 A1 | 9/2017 |
| DE | 102017108372 A1 | 7/2018 |

(Continued)

OTHER PUBLICATIONS

International Search Report and Written Opinion of the International Searching Authority for International application No. PCT/EP2022/078415 dated Dec. 21, 2022.

(Continued)

*Primary Examiner* — Toan C To
(74) *Attorney, Agent, or Firm* — Carlson, Gaskey & Olds, P.C.

(57) ABSTRACT

Aspects of the present invention relate to a active roll bar damper assembly (1) suitable for an active roll bar (5). The active roll bar damper assembly (1) includes a first subassembly (15-1) and a second subassembly (15-2) for mounting to the active roll bar (5). The first subassembly (15-1) includes a rigid first mass (17) having a first aperture (27). At least one first spring (21-*n*) is disposed in the first aperture (27) for positioning between the active roll bar (5) and the first mass (17). The second subassembly (15-2) includes a rigid second mass (37) having a second aperture (47). At least one second spring (41-*n*) is disposed in the second aperture (47) for positioning between the active roll bar (5) and the first mass (17). The first and second masses (17, 37) are configured to engage each other to limit compression of the first and second springs (21-*n*, 41-*n*). Aspects of the present invention also relate to an active roll control (Continued)

system (3) including an active roll bar damper assembly (1); and a vehicle (V).

13 Claims, 7 Drawing Sheets

(56) References Cited

U.S. PATENT DOCUMENTS

| | | | | |
|---|---|---|---|---|
| 5,971,859 | A * | 10/1999 | Runge | F16F 15/10 |
| | | | | 464/83 |
| 6,007,058 | A * | 12/1999 | Kokubo | F16B 17/008 |
| | | | | 248/634 |
| 6,450,487 | B1 * | 9/2002 | Kuwayama | F16F 15/1442 |
| | | | | 267/141 |
| 6,793,050 | B2 * | 9/2004 | Nylander | F16F 15/10 |
| | | | | 267/141.1 |
| 10,907,698 | B2 * | 2/2021 | Moreno Castro | F16F 1/3821 |
| 11,732,770 | B2 * | 8/2023 | Lee | B60H 1/00571 |
| | | | | 188/378 |
| 2003/0042086 | A1 | 3/2003 | Nylander et al. | |
| 2016/0137018 | A1 | 5/2016 | Khanlarov et al. | |
| 2020/0070617 | A1 | 3/2020 | Lim et al. | |
| 2022/0134835 | A1 * | 5/2022 | Izak | B60G 21/0553 |
| | | | | 701/38 |

FOREIGN PATENT DOCUMENTS

| | | |
|---|---|---|
| EP | 1837212 A1 | 9/2007 |
| EP | 1953014 A1 | 8/2008 |
| FR | 2714433 A1 | 6/1995 |
| JP | 2015203425 A | 11/2015 |

OTHER PUBLICATIONS

Combined Search and Examination Report under Sections 17 and 18(3) for Application No. GB2114663.4 dated Feb. 3, 2022.

* cited by examiner

ACTIVE ROLLER BAR DAMPER ASSEMBLY

TECHNICAL FIELD

The present disclosure relates to an active roll bar damper assembly. Aspects of the invention relate to an active roll bar damper assembly for damping vibrations in an active roll bar; to an active roll control system including an active roll bar damper assembly; and to a vehicle.

BACKGROUND

It is known to provide a mass damper assembly to reduce vibrations in a vehicle component, such as a driveshaft. The mass damper assembly typically includes a mass which is movable relative to the vehicle component. One or more damping spring is provided to control relative movement of the mass. The contact surface between the mass damper assembly and the vehicle component affects the behaviour of the mass damper assembly. The damping characteristics may be affected by the compression forces applied to the one or more damping spring during assembly. For example, varying compression forces may affect the contact surface between the one or more damping spring and the vehicle component. Any such variations in the damping characteristics may influence the operation of the mass damper assembly.

It is an aim of the present invention to address one or more of the disadvantages associated with the prior art.

SUMMARY OF THE INVENTION

Aspects and embodiments of the invention provide an active roll bar damper assembly, an active roll control system, and a vehicle as claimed in the appended claims.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
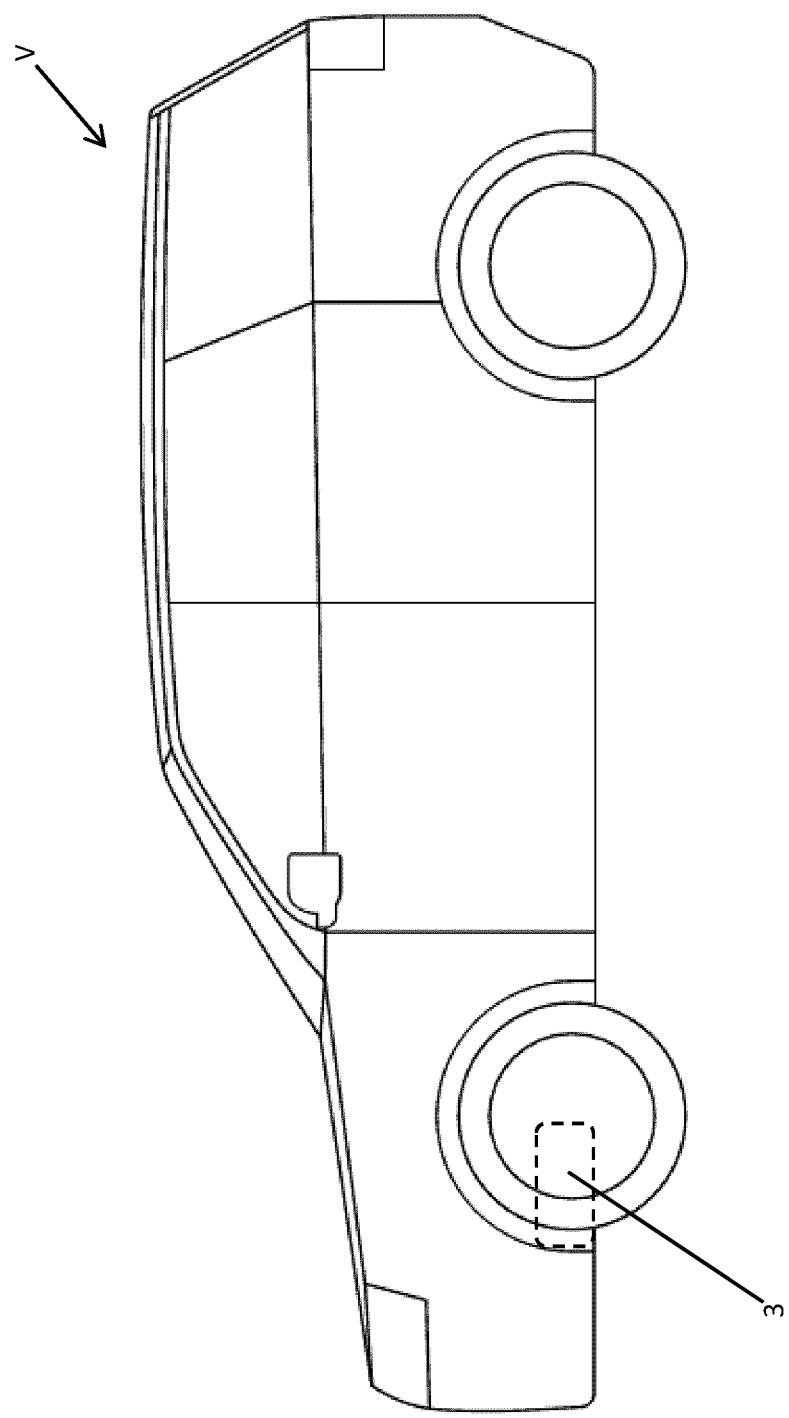
FIG. 1 shows a road vehicle comprising an active roll control system including an active roll bar damper assembly in accordance with an embodiment of the present invention.

An active roll bar damper assembly 1 in accordance with an embodiment of the present invention is described herein with reference to the accompanying Figures. As shown schematically in FIG. 1, the active roll bar damper assembly 1 is provided in a vehicle V. The vehicle V in the present embodiment is an automobile. The active roll bar damper assembly 1 could be used in other road vehicles.

Figure 2:
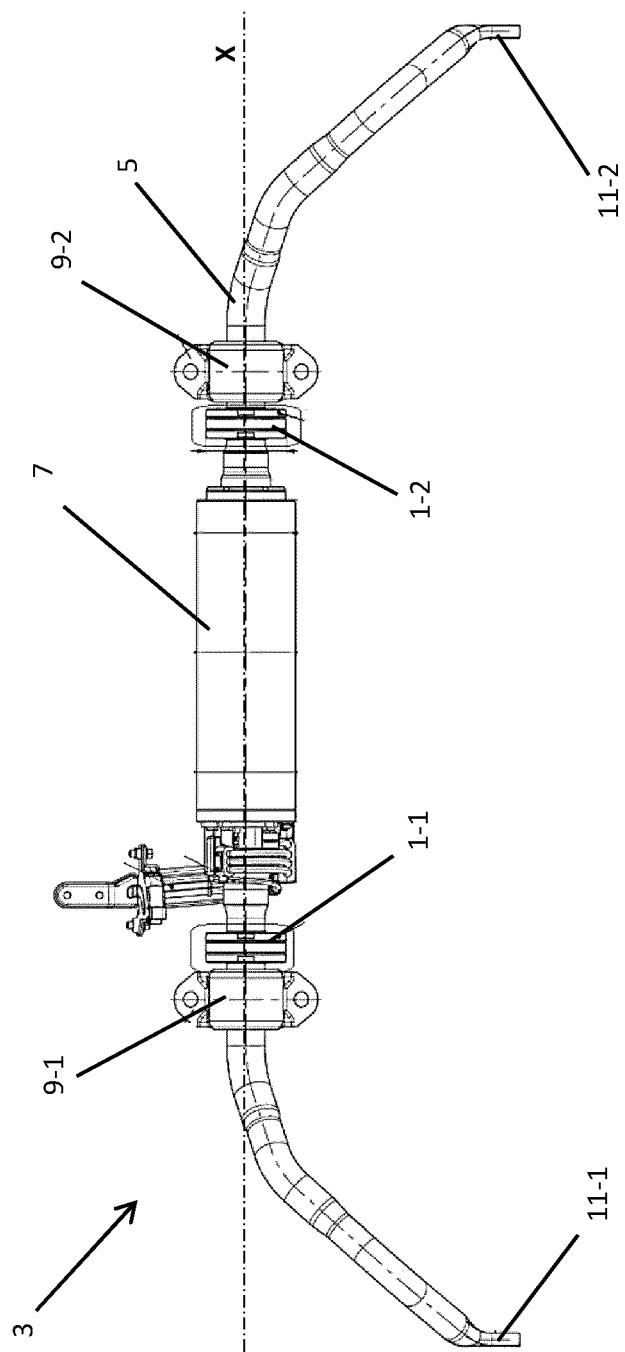
FIG. 2 shows a perspective view of the active roll control system in the vehicle shown in FIG. 1.

The active roll bar damper assembly 1 functions as a dynamic absorber for damping vibrations occurring in an active roll control (ARC) system 3. The active roll control system 3 in the present embodiment is disposed at the front of the vehicle V. Alternatively, or in addition, the active roll control system 3 may be disposed at the rear of the vehicle V. The active roll control system 3 in the present embodiment is an electrical active roll control (eARC) system. Alternatively the active roll control system 3 may be a hydraulic active roll control system. As shown in FIG. 2, the active roll control system 3 comprises a roll bar 5, an actuator 7, a first sub-frame mount 9-1, a second sub-frame mount 9-2, a first drop-link mount 11-1 and a second drop-link mount 11-2. The actuator 7 is operative to generate a torque actively to control the operating characteristics of the roll bar 5. The actuator 7 in the present embodiment comprises an electrical actuator and a gearbox, but other embodiments may comprise a hydraulic actuator and gearbox. Vibrations may arise within the actuator 7 due to torque fluctuations generated by the actuator 7. For example, electric motors may generate ripples in torque due to passing of coils and magnets within the motor, or due to hydraulic impulses within a hydraulic actuator, or due to cavitation within the hydraulic fluid. Vibrations may also arise within the gearbox as gears mesh together, or due to backlash between gears. As the active roll control system 3 acts to control the degree of vehicle roll then the vibrations will arise in a highly transient manner, as the need for roll control depends on the instantaneous dynamic behaviour of the vehicle. Vibrations originating within the actuator 7 and/or gearbox may then be amplified by a resonance of the active roll control system 3 and/or of the active roll bar 5. The inventors have realised that such vibrations are best absorbed close to their source, which then avoids the vibration being transmitted into the vehicle structure and cabin where it may be observed by an occupant of the vehicle. Vehicle occupants tend to perceive transient noises and/or vibration as unpleasant or as indicative of poor quality.

The active roll bar 5 has a central longitudinal axis X. The active roll control system 3 comprises a first of the mass damper assemblies 1-1 and a second of the mass damper assemblies 1-2. The first and second mass damper assemblies 1-1, 1-2 are mounted to the roll bar 5 on opposing sides of the actuator 7. The mass damper assemblies 1 have like configurations. For the sake of brevity, only one of the mass damper assemblies 1 is described herein with reference to FIGS. 3, 4 and 5.

Figure 3:
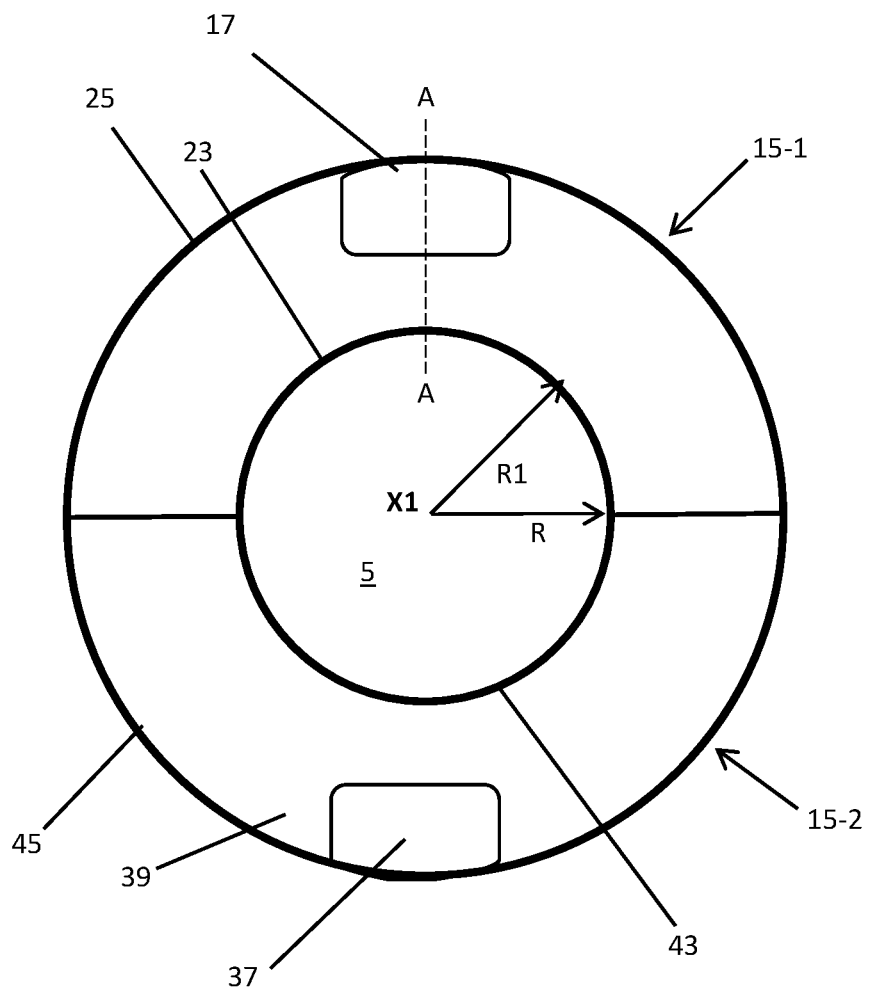
FIG. 3 shows an end elevation of an active roll bar damper assembly disposed on an active roll bar of the active roll control system shown in FIG. 2.
Figure 4B:
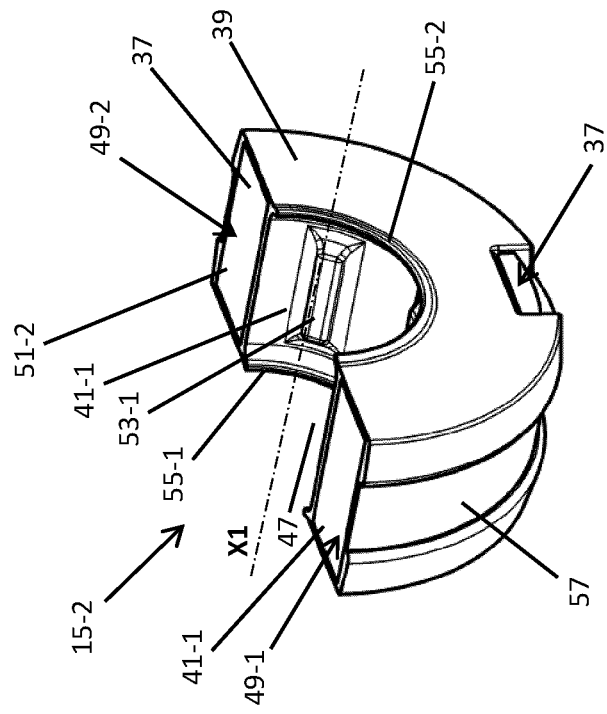
FIGS. 4a and 4b show perspective views of the first and second subassemblies of the active roll bar damper assembly shown in FIG. 3.

As shown in FIG. 3, the active roll bar damper assembly 1 comprises a first subassembly 15-1 and a second subassembly 15-2. The first and second subassemblies 15-1, 15-2 are configured to be mounted to the active roll bar 5. In particular, the first and second subassemblies 15-1, 15-2 are configured to be mounted to opposing sides of the active roll bar 5. The active roll bar 5 has a radius R. The radius R in the present embodiment is 13.5 mm, but the active roll bar damper assembly 1 can be adapted for different radii. The first and second subassemblies 15-1, 15-2 are sized to accommodate the active roll bar 5. In the present embodiment, the first and second subassemblies 15-1, 15-2 have like configurations. The first and second subassemblies 15-1, 15-2 will now be described.

The first subassembly 15-1 comprises a first mass 17, a first casing 19 and at least one first spring 21-$n$. The at least one first spring 21-$n$ is a damping spring. The first subassembly 15-1 comprises a plurality of the first springs 21-$n$. Each of the first springs 21-$n$ comprises a first resiliently deformable member. The first casing 19 in the present embodiment integrally forms the first springs 21-$n$. In particular, the first casing 19 is moulded from a resiliently deformable material, such as rubber or another polymer. The casing 19 is over-moulded onto the first mass 17 at least partially to encapsulate the first mass 17. The first mass 17 has a rigid, inflexible structure. The first mass 17 is composed of a metal, for example cast or machined to the final shape. It will be understood that the first mass 17 may be formed from other materials having a rigid structure. In a variant, the or each first spring 21-$n$ may be formed separately from the first casing 19, for example as an insert which is inserted into the pre-moulded first casing 19.

Figure 4A:
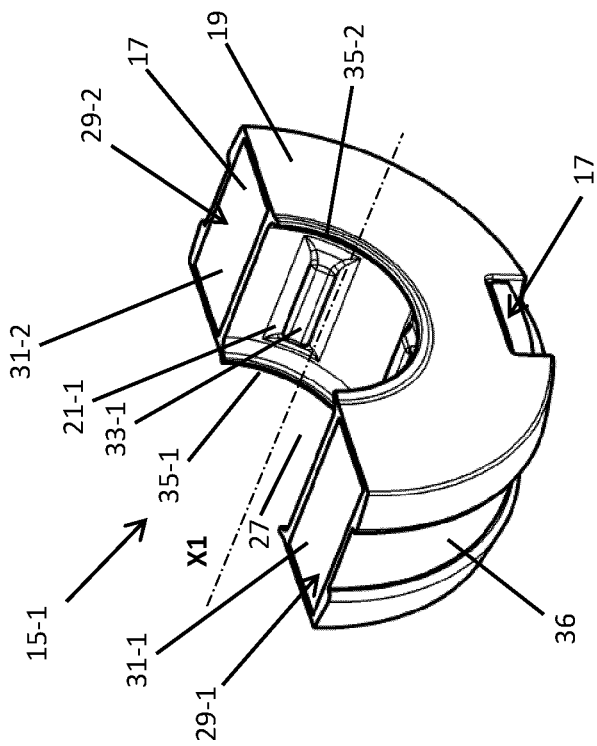
Figure 5:
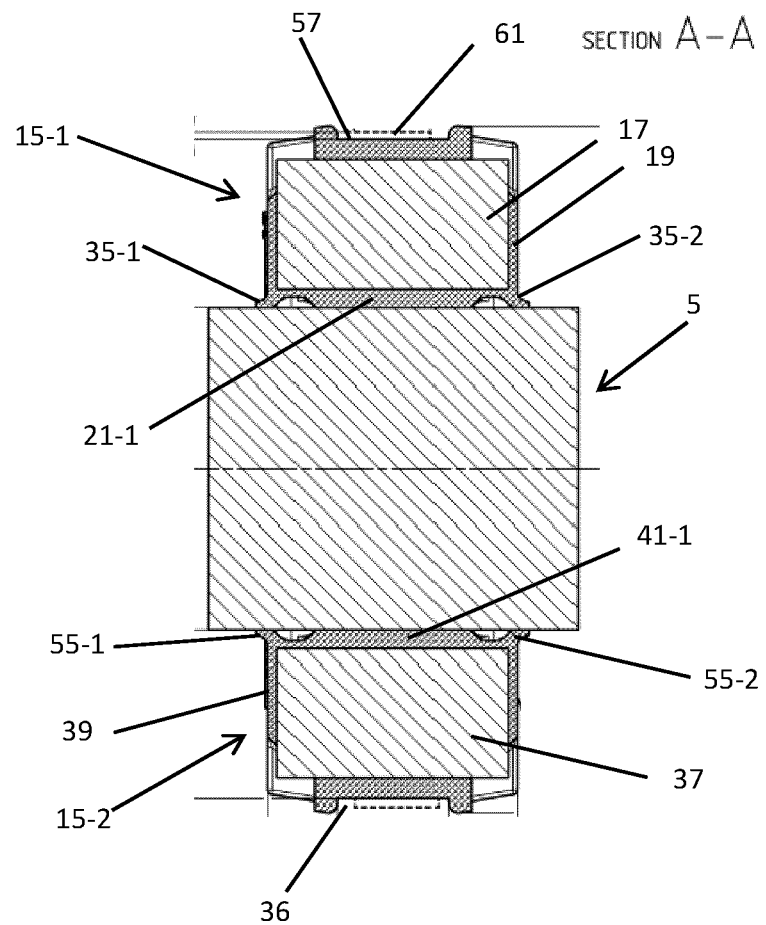
FIG. 5 shows a section view along section A-A shown in FIG. 3.

The first mass 17 has a central longitudinal axis X1 which, in use, is substantially coaxial with the central longitudinal axis X of the active roll bar 5. The central longitudinal axis X1 extends perpendicular to the plane of the page in FIG. 3. The first mass 17 comprises a first inner surface 23 and a first outer surface 25. The first mass 17 comprises a first aperture 27 which defines the first inner surface 23. As shown in FIG. 3 and FIG. 4A, the first inner surface 23 comprises a first concave profile. The first aperture 27 in the present embodiment has a semi-circular profile centred on the central longitudinal axis X1. The first aperture 27 is sized to receive a portion of the active roll bar 5. The first aperture 27 has a first radius R1 which is greater than the radius R of the active roll bar 5. The first inner surface 23 comprises a right cylindrical surface. The first outer surface 25 also comprises a right cylindrical surface. The first mass 17 comprises a circular arc (i.e. part annular). The first mass 17 comprises a part-annular member (i.e. an annular sector). The first inner surface 23 and/or the first outer surface 25 may comprise a non-circular profile, for example comprising a regular polygon. As shown in FIG. 4A, the first mass 17 comprises first ends 29-1, 29-2 spaced apart from each other in a diametrical plane. The casing 19 is open at each end so as not to cover the first ends 29-1, 29-2 of the first mass 17. The first ends 29-1, 29-2 are, therefore, exposed. The first ends 29-1, 29-2 form first reaction surfaces 31-1, 31-2 for engaging the second subassembly 15-2.

The first springs 21-$n$ are formed integrally on a radially inner surface of the first casing 19. The first springs 21-$n$ are configured, in use, to engage an outer surface of the active roll bar 5. Each first spring 21-$n$ comprises a projection formed on an inner surface of the first casing 19. The projections extend radially inwardly to engage the active roll bar 5. Each spring comprises 21-$n$ comprises a spring contact surface 33-$n$ for contacting an outer surface of the active roll bar 5. Each spring contact surface 33-$n$ is rectangular in the present embodiment. The first springs 21-$n$ each extend in a direction parallel to the central longitudinal axis X1. The first springs 21-$n$ may be sized to tune the active roll bar damper assembly 1 for a particular application. Alternatively, or in addition, the composition of the polymer used to mould the first springs 21-$n$ may be selected to provide appropriate damping characteristics.

As shown in FIGS. 4A$n$ and 5, the first subassembly 15-1 comprises two (2) first seals 35-1, 35-2 for forming a seal with the active roll bar 5. The first seals 35-1, 35-2 are formed integrally with the casing 19. Each first seal 35-1, 35-2 comprises a lip seal in the present embodiment. The first seals 35-1, 35-2 extend around the perimeter of the first aperture 27 and have a semi-circular profile. The first seals 35-1, 35-2 are provided to help prevent or reduce the ingress of contaminants between the first subassembly 15-1 and the active roll bar 5. The contaminants may otherwise alter the damping characteristics of the active roll bar damper assembly 1.

A first channel 36 is formed in an external surface of the first casing 19. As described herein, the first channel 36 is provided to locate a retainer for fastening the active roll bar damper assembly 1 to the active roll bar 5.

The second subassembly 15-2 comprises a second mass 37, a second casing 39 and at least one second spring 41-$n$. The at least one second spring 41-$n$ is a damping spring. Each of the second springs 41-$n$ comprises a second resiliently deformable member. The second subassembly 15-2 comprises a plurality of the second springs 41-$n$. The second casing 39 in the present embodiment is configured to form the second springs 41-$n$ integrally. In particular, the second casing 39 is moulded from a resiliently deformable material, such as rubber or another polymer. The casing 39 is over-moulded onto the second mass 37 at least partially to encapsulate the second mass 37. The second mass 37 has a rigid, inflexible structure. The second mass 37 is composed of a metal, for example cast or machined to the final shape. It will be understood that the second mass 37 may be formed from other materials having a rigid structure. In a variant, the or each second spring 41-$n$ may be formed separately from the second casing 39, for example as an insert which is inserted into the pre-moulded first casing 39.

The second mass 37 has a central longitudinal axis X1 which, in use, is substantially coaxial with the central longitudinal axis X of the active roll bar 5. The central longitudinal axis X1 extends perpendicular to the plane of the page in FIG. 3. The second mass 37 comprises a second inner surface 43 and a second outer surface 45. The second mass 37 comprises a second aperture 47 which defines the second inner surface 43. As shown in FIG. 3, the second inner surface 43 comprises a second concave profile. The second aperture 47 in the present embodiment has a semi-circular profile centred on the central longitudinal axis X1. The second aperture 47 is sized to receive a portion of the active roll bar 5. The second aperture 47 has a radius which is at least substantially the same as the first radius R1 of the first aperture 27 provided in the first mass 17. As outlined above, the first radius R1 is greater than the radius R of the active roll bar 5. As shown in FIG. 4B, the second inner surface 43 comprises a right cylindrical surface. The second outer surface 45 also comprises a right cylindrical surface. The second mass 37 comprises a circular arc. Thus, the second mass 37 comprises a part-annular member (i.e. an annular sector). The second mass 37 comprises a part-annular member (i.e. an annular sector). The second inner surface 43 and/or the second outer surface 45 may comprise a non-circular profile, for example comprising a regular polygon. The second mass 37 comprises second ends 49-1, 49-2 spaced apart from each other in a diametrical plane. The casing 39 is open at each end so as not to cover the first ends 49-1, 49-2 of the second mass 37. The first ends 49-1, 49-2 are, therefore, exposed. The second ends 49-1, 49-2 form second reaction surfaces 53-1, 53-2 for engaging the first subassembly 15-1.

The second springs 41-$n$ are formed on a radially inner surface of the second casing 39. The second springs 41-$n$ are configured, in use, to engage an outer surface of the active roll bar 5. Each second spring 41-$n$ comprises a projection formed on an inner surface of the second casing 39. The projections extend radially inwardly to engage the active roll bar 5. Each second spring 41-$n$ comprises a spring contact surface 53-$n$ for contacting an outer surface of the active roll bar 5. Each spring contact surface 53-$n$ is rectangular in the present embodiment. The first springs 21-$n$ each extend in a direction parallel to the central longitudinal axis X1. A spring contact surface 53-$n$ of each second spring 41-$n$ contacts the active roll bar 5. The second springs 41-$n$ each extend parallel to the central longitudinal axis X1. The second springs 41-$n$ may be sized to tune the active roll bar damper assembly 1 for a particular application. Alternatively, or in addition, the composition of the polymer used to mould the second springs 41-$n$ may be selected to provide appropriate damping characteristics.

The second subassembly 15-2 comprises two (2) second seals 55-1, 55-2 for forming a seal with the active roll bar 5. The second seals 55-1, 55-2 are formed integrally with the casing 19. Each second seal 55-1, 55-2 comprises a lip seal in the present embodiment. The second seals 55-1, 55-2 extend around the perimeter of the second aperture 47 and have a semi-circular profile. The second seals 55-1, 55-2 are provided to help prevent or reduce the ingress of contaminants between the second subassembly 15-2 and the active roll bar 5. The contaminants may otherwise alter the damping characteristics of the active roll bar damper assembly 1.

A second channel 56 is formed in an external surface of the second casing 39. As described herein, the second channel 56 is provided to locate a retainer for fastening the active roll bar damper assembly 1 to the active roll bar 5. The retainer comprises a clamp 61 in the present embodiment.

The first and second subassemblies 15-1, 15-2 are mounted to the active roll bar 5 to form an annular assembly. The first ends 29-1, 29-2 of the first mass 17 engage the second ends 49-1, 49-2 of the second mass 37. The first and second masses 17, 37 collectively form an annulus extending around the active roll bar 5. As the first and second masses 17, 37 directly engage each other, the resulting annulus has a fixed diameter. The first and second springs 21-$n$, 41-$n$ are configured to engage the outer surface of the active roll bar 5. The first reaction surfaces 31-1, 31-2 of the first mass 17 engage the second reaction surfaces 51-1, 51-2 of the second mass 37. More particularly, the first and second reaction surfaces 31-1, 31-2; 51-1, 51-2 abut each other in a face-to-face arrangement.

A clamp 61 (shown in FIG. 5) is provided around the first and second subassemblies 15-1, 15-2. The clamp 61 is annular and locates in the first and second channels 36, 56 formed in the first and second casings 19, 39. The clamp 61 may, for example, comprise a screw clamp or a spring clamp. The clamp 61 applies a retaining force to the first and second subassemblies 15-1, 15-2. The rigid structure of the first and second masses 17, 37 limits compression of the first and second springs 21-$n$, 41-$n$. The first and second masses 17, 37 form a structural component having a fixed diameter. The interaction between the first and second masses 17, 37 limits compression of the first and second springs 21-$n$, 41-$n$. The first radius R1 of the first and second apertures 25, 45 limit the compression of the first and second springs 21-$n$, 41-$n$. In particular, excessive tightening (or overtightening) of the clamp 61 does not alter the damping characteristics of the active roll bar damper assembly 1. Thus, the contact surface between the first and second springs 21-$n$, 41-$n$ and the active roll bar 5 may be at least substantially constant irrespective of the clamping force applied by the clamp 61.

The first subassembly 15-1 comprises three (3) first springs 21-$n$; and the second subassemblies 15-2 comprises three (3) second springs 41-$n$. The first and second springs 21-$n$, 41-$n$ extend radially inwardly and have a uniform angular distribution. The first and second masses 17, 37 are sized to provide the desired damping characteristics. The radius of the inner surfaces 23, 43 of the first and second masses 17, 37 may be increased or decreased to adjust the compression force applied to the first and second springs 21-$n$, 41-$n$. A smaller first radius R1 would enable increased compression of the first and second springs 21-$n$, 41-$n$. Conversely, a larger first radius R1 would enable reduced compression of the first and second springs 21-$n$, 41-$n$. The first and second masses 17, 37 are configured to tune the dynamic operating parameters of the active roll bar damper assembly 1.

Alternatively, or in addition, the configuration of the first and second springs 21-$n$, 41-$n$ may be configured to tune the dynamic operating parameters of the active roll bar damper assembly 1. For example, the radial extent and/or the circumferential extent of the first and second springs 21-$n$, 41-$n$ may be increased or decreased to adjust damping of the first and second masses 17, 37.

In use, the active roll bar damper assembly 1 is a dynamic absorber effective in reducing vibrations in the active roll control (ARC) system 3. The first and second springs 21-$n$, 41-$n$ provide an interface for the first and second masses 17, 37. The active roll bar damper assembly 1 is effective in creating a two (2) degrees of freedom system (2DOF). The active roll bar damper assembly 1 is effective in introducing a second resonance (or mode of vibration). The resonance frequency of the active roll bar damper assembly 1 in the present embodiment is 500 Hz±10%.

The tune of the active roll bar damper assembly 1 is influenced by the contact surface between the active roll bar 5 and the first and second springs 21-$n$, 41-$n$. The size of the contact surface may affect the natural frequency of the active roll bar damper assembly 1. Compressing the first and second springs 21-$n$, 41-$n$ with a higher clamping force will change the tune. To avoid this effect, the first and second masses 17, 37 contact each other when the active roll bar damper assembly 1 is assembled to limit the compression of the first and second springs 21-$n$, 41-$n$, hence reducing the effect of assembly force. The provision of first and second seals 35-$n$; 55-$n$) helps to reduce or avoid dirt accumulation between active roll bar 5 and the active roll bar damper assembly 1. This may improve reliability by maintaining a constant contact patch between the first and second springs 21-$n$, 41-$n$ and the active roll bar 5.

Figure 6:
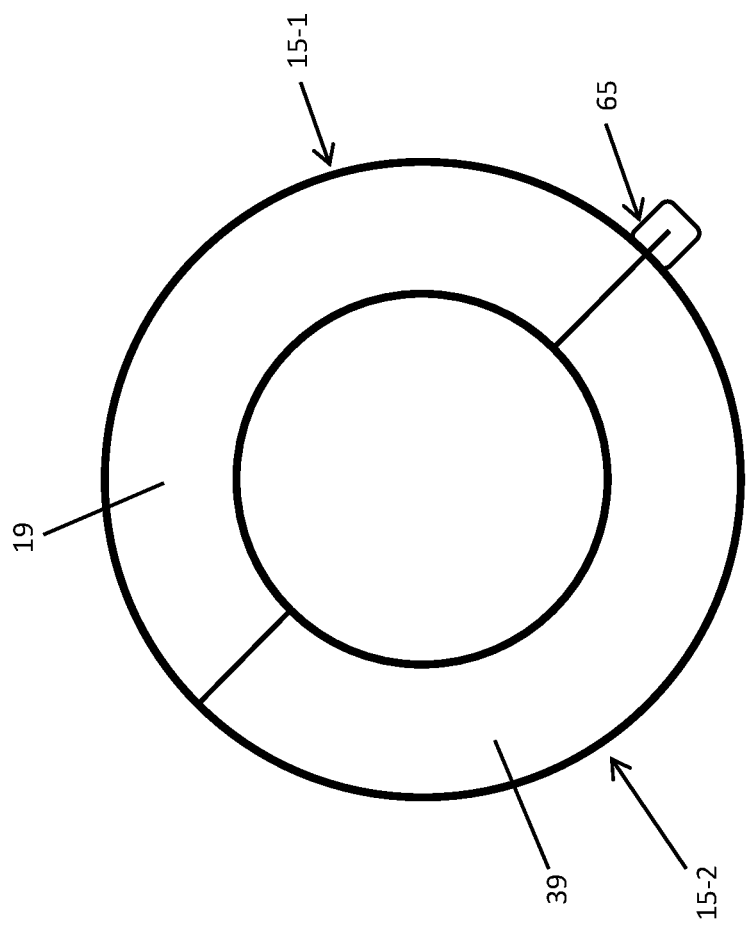
FIG. 6 shows an end elevation of an active roll bar damper assembly according to a variant of the present invention.
Figure 7:
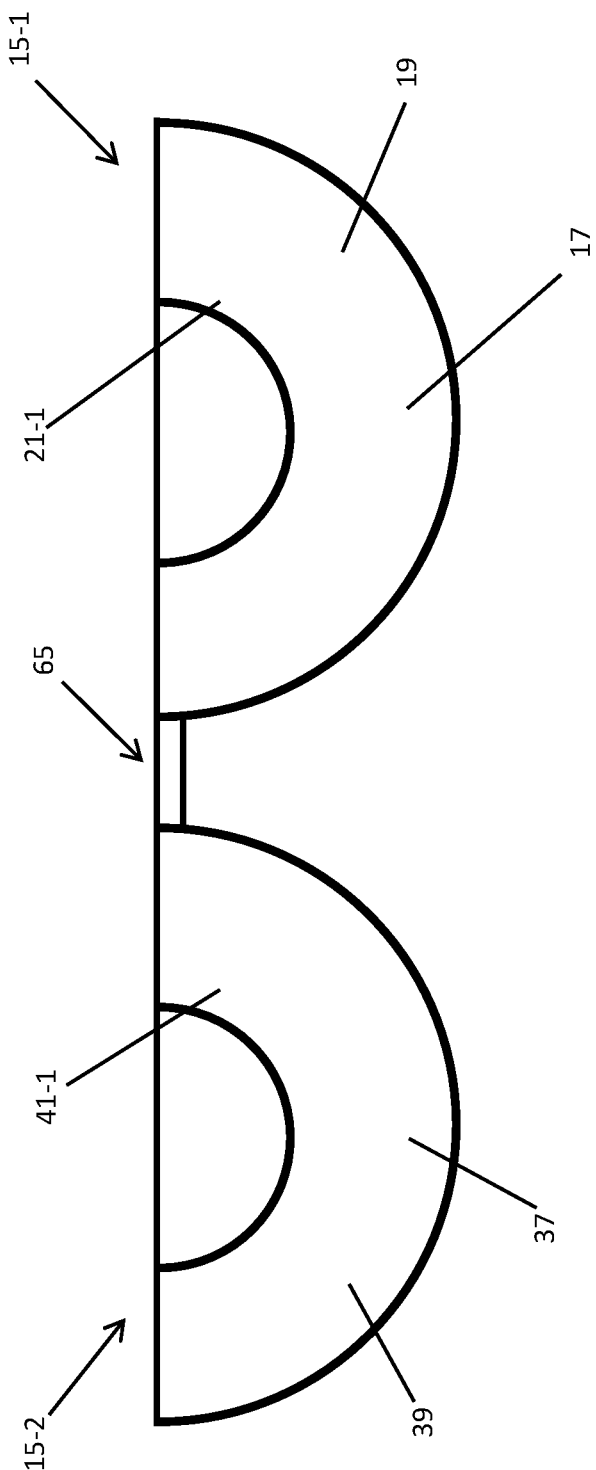
FIG. 7 shows an end elevation of the active roll bar damper assembly shown in FIG. 6 with the first and second subassemblies in an open configuration.

A variant of the active roll bar damper assembly 1 will now be described with reference to FIGS. 6 and 7. Like reference numerals are used for like components. The active roll bar damper assembly 1 comprises first and second subassemblies 15-1, 15-2. The first and second subassemblies 15-1, 15-2 are connected to each other in a clamshell arrangement for positioning on the active roll bar 5.

The first subassembly 15-1 comprises a first mass 17 and a first casing 19. At least one first spring 21-$n$ is formed in the first subassembly 15-1. The second subassembly 15-2 comprises a second mass 37 and a first casing 39. At least one second spring 41-$n$ is formed in the second subassembly 15-2. In this arrangement, the first and second casings 19, 39 are connected to each other by a connector 65. The connector 65 in this embodiment comprises a hinge to enable hinged movement of the first and second subassemblies 15-1, 15-2 relative to each other. The connector 65 comprises a live hinge which is integrally moulded with the first and second casings 19, 39. In this arrangement, the first and second subassemblies 15-1, 15-2 may be integrally moulded, for example by over moulding the first and second casings 19, 39 onto the first and second masses 17, 37. As shown in FIGS. 6 and 7, the connector 65 enables hinged movement of the first and second casings 19, 39 to locate the active roll bar damper assembly 1 on the active roll bar 5. The active roll bar damper assembly 1 is shown in a closed configuration in FIG. 6; and in an open configuration in FIG. 7. This hinged arrangement may facilitate installation of the active roll bar damper assembly 1. A clamp (not shown) is provided to retain the active roll bar damper assembly 1 on the active roll bar 5. The first and second casings 19, 39 in this variant do not include seals for forming a seal with the active roll bar 5. It will be understood that one or more such seal be incorporated into the first and second casings 19, 39.

The first and second masses 17, 37 each comprise a part-annular member having an inside radius of 16.5 mm and an outside radius of 23 mm. The first subassembly 15-1 comprises four (4) first springs 21-$n$; and the second subassemblies 15-2 comprises four (4) second springs 41-$n$. The first and second springs 21-$n$, 41-$n$ extend radially inwardly and have a uniform angular distribution. The inside radius of the (undeformed) first and second springs 21-$n$, 41-$n$ in this arrangement is 12.4 mm. The active roll bar 5 in this arrangement has an outside radius of 13.5 mm.

It will be appreciated that various changes and modifications can be made to the present invention without departing from the scope of the present application.

The first and second reaction surfaces 31-1, 31-2; 51-1, 51-2 of the first and second masses 17, 37 in the embodiment(s) described herein have a planar configuration. In a variant, the first and second reaction surfaces 31-1, 31-2; 51-1, 51-2 could have non-planar complementary surfaces. For example, the first and second reaction surfaces 31-1, 31-2; 51-1, 51-2 may comprise a keyed or stepped profile, for example to limit or prevent relative radial and/or longitudinal movement.

According to a further aspect of the present invention there is provided an active roll control system comprising an active roll bar; and at least one active roll bar damper assembly. The active roll bar damper assembly comprises first and second masses mounted on the active roll bar, and at least one spring disposed between the first and second masses and the active roll bar. The first and second masses are configured to engage each other to limit compression of the at least one spring. The first and second masses may be arranged to form an annulus around the active roll bar. Each of the first and second masses may be part-annular in shape. The first and second masses may each be semi-circular in shape. The active roll bar damper assembly may comprise more than two masses. The at least one spring may be disposed between the at least one mass and the active roll bar. The active roll bar damper assembly may comprise first and second spring associated with the first and second masses respectively.

The invention claimed is:

1. An active roll bar damper assembly for an active roll bar, the active roll bar damper assembly comprising:
   a first subassembly for mounting to the active roll bar, the first subassembly comprising:
      a rigid first mass comprising a first annular sector defining a first aperture, the first annular sector having opposed first ends;
      a first casing partially encapsulating the first annular sector such that the opposed first ends are uncovered; and
      at least one first spring disposed in the first aperture for positioning between the active roll bar and the first mass;
   a second subassembly for mounting to the active roll bar, the second subassembly comprising:
      a rigid second mass comprising a second annular sector defining a second aperture, the second annular sector having opposed second ends;
      a second casing partially encapsulating the second annular sector such that the opposed second ends are uncovered; and
      at least one second spring disposed in the second aperture for positioning between the active roll bar and the first mass;
   wherein the first subassembly and the second subassembly are configured to be assembled onto opposing sides of the active roll bar in an engaged position in which the opposed first ends abut against the respective opposed second ends, limiting compression of the first and second springs.

2. An active roll bar damper assembly as claimed in claim 1, wherein the first aperture comprises a first inner surface having a first concave profile; and the second aperture comprises a second inner surface having a second concave profile;
   the first concave profile comprises a first semi-circle; and the second concave profile comprises a second semi-circle; the first and second semi-circles being sized to limit compression of the first and second springs.

3. An active roll bar damper assembly as claimed in claim 1, wherein each of the first and second masses comprises a part-annular member; wherein, in use, the first and second masses cooperate with each other to form an annulus for extending around the active roll bar.

4. An active roll bar damper assembly as claimed in claim 1, wherein the or each first spring comprises at least one first resiliently deformable member; and the or each second spring comprises at least one second resiliently deformable member;
   each of the first and second resiliently deformable members is moulded from a polymer.

5. An active roll bar damper assembly as claimed in claim 4, wherein the or each first resiliently deformable member extends in a longitudinal direction parallel to a central longitudinal axis of the first subassembly; and the or each second resiliently deformable member extends in a longitudinal direction parallel to a central longitudinal axis of the second subassembly.

6. An active roll bar damper assembly as claimed in claim 4, wherein the first resiliently deformable member is formed integrally with the first casing; and wherein the second resiliently deformable member is formed integrally with the second casing.

7. An active roll bar damper assembly as claimed in claim 6, wherein the first and second casings are over-moulded onto the first and second masses respectively.

8. An active roll bar damper assembly as claimed in claim 1 comprising a hinge for connecting the first and second subassemblies.

9. An active roll bar damper assembly as claimed in claim 1, wherein the first subassembly comprises at least one first seal for forming a seal with the active roll bar; and the second subassembly comprises at least one second seal for forming a seal with the active roll bar.

10. An active roll bar damper assembly as claimed in claim 1, comprising a retainer for retaining the first and second subassemblies on the active roll bar.

11. An active roll bar damper assembly as claimed in claim 10, wherein the retainer comprises a clamp for locating around an exterior of the first and second subassemblies; the retainer comprises a screw clamp or a spring clamp.

12. An active roll control system comprising an active roll bar; and at least one active roll bar damper assembly as claimed in claim 1, the at least one active roll bar damper assembly being mounted on the active roll bar.

13. A vehicle comprising an active roll bar damper assembly as claimed in claim 1.

\* \* \* \* \*